(12) United States Patent
Ziegenfuss et al.

(10) Patent No.: US 11,541,458 B2
(45) Date of Patent: Jan. 3, 2023

(54) METHOD AND SYSTEM FOR MANUFACTURING SMALL ADAPTIVE ENGINES

(71) Applicant: MOLYWORKS MATERIALS CORPORATION, Los Gatos, CA (US)

(72) Inventors: Stephen Ziegenfuss, Jackson, MI (US); Christopher Paul Eonta, Los Gatos, CA (US); Andrew VanOs LaTour, Hayward, CA (US)

(73) Assignee: MolyWorks Materials Corporation, Cloverdale, CA (US)

( * ) Notice: Subject to any disclaimer, the term of this patent is extended or adjusted under 35 U.S.C. 154(b) by 257 days.

(21) Appl. No.: 16/893,640

(22) Filed: Jun. 5, 2020

(65) Prior Publication Data

US 2021/0008620 A1  Jan. 14, 2021

Related U.S. Application Data

(60) Provisional application No. 62/872,322, filed on Jul. 10, 2019.

(51) Int. Cl.
*B22F 10/00* (2021.01)
*B22F 5/00* (2006.01)
(Continued)

(52) U.S. Cl.
CPC .............. *B22F 10/00* (2021.01); *B22F 5/009* (2013.01); *B22F 10/10* (2021.01);
(Continued)

(58) Field of Classification Search
CPC ................................ B22F 10/00; B33Y 10/00
(Continued)

(56) References Cited

U.S. PATENT DOCUMENTS

| 9,925,591 B2 | 3/2018 | Eonta et al. |
| 10,654,106 B2 | 5/2020 | Eonta et al. |

(Continued)

OTHER PUBLICATIONS

International Application No. PCT/US20/041110, international filing date Jul. 8, 2020, Search Report and the Written Opinion of the International Searching Authority, dated Oct. 9, 2020, pp. 1-10.

*Primary Examiner* — Weiping Zhu
(74) *Attorney, Agent, or Firm* — Stephen A. Gratton

(57) ABSTRACT

A method for manufacturing small adaptive engines uses a battlefield repository having cloud services that is configured to enable additive manufacturing (AM) of engine parts and assemblies. The method also uses a compilation of recipes/signatures for building the engine parts and the assemblies using additive manufacturing (AM) processes and machine learning programs. An additive manufacturing system and an alloy powder suitable for performing the additive manufacturing (AM) processes can be provided. In addition, the engine parts can be built using the additive manufacturing (AM) system, the alloy powder, the battlefield repository and the compilation of recipes/signatures. A system for manufacturing small adaptive engines includes the battlefield repository, the compilation of recipes/signatures, a foundry system for providing the alloy powder and an additive manufacturing (AM) system configured to perform the additive manufacturing (AM) processes.

15 Claims, 7 Drawing Sheets

(51) Int. Cl.
    *B33Y 80/00*         (2015.01)
    *B33Y 10/00*         (2015.01)
    *B33Y 30/00*         (2015.01)
    *B22F 10/10*         (2021.01)

(52) U.S. Cl.
    CPC ....... *B22F 2202/11* (2013.01); *B22F 2301/15* (2013.01); *B22F 2301/205* (2013.01); *B22F 2998/10* (2013.01); *B33Y 10/00* (2014.12); *B33Y 30/00* (2014.12); *B33Y 80/00* (2014.12)

(58) Field of Classification Search
    USPC .................................................. 219/121.63
    See application file for complete search history.

(56) References Cited

U.S. PATENT DOCUMENTS

| | | |
|---|---|---|
| 11,235,389 B2 | 2/2022 | LaTour et al. |
| 2008/0237200 A1 | 10/2008 | Forbes Jones |
| 2013/0297062 A1 | 11/2013 | Lacaze et al. |
| 2014/0163717 A1 | 6/2014 | Das et al. |
| 2016/0158889 A1 | 6/2016 | Carter et al. |
| 2018/0339456 A1* | 11/2018 | Czinger ............. G05B 19/4189 |
| 2020/0189000 A1 | 6/2020 | LaTour et al. |
| 2021/0008621 A1 | 1/2021 | Eonta et al. |

\* cited by examiner

METHOD AND SYSTEM FOR MANUFACTURING SMALL ADAPTIVE ENGINES

CROSS REFERENCE TO RELATED APPLICATION

This application claims priority from U.S. Provisional No. 62/872,322, filed Jul. 10, 2019, which is incorporated herein by reference.

FIELD

This disclosure relates to a method and system for manufacturing small adaptive engines.

BACKGROUND

On-demand and low-cost, high-precision, adaptable manufacturing has been a driving need of many industries. Companies that do it well can create a greater depth of products offered at larger margins relative to competitive technology. Greater numbers of products and their capabilities can help provide 'capacitance' to sometimes aggressively switching markets. This in turn can create long-term survivability.

Similarly, in the defense business, direct access to high precision manufacturing at relatively low rates can increase the number of available fielded systems, which can positively affect the outcome of a conflict. Furthermore, adaptable manufacturing models allow engineers to innovate more quickly in both proactive and reactive ways. Likely greater than simply reducing cost to market (while retaining very high functionality) such a process would be another tool by which our defense community can more effectively respond to out-of-band threats.

This disclosure relates to a method and system for manufacturing small adaptive engines with low manufacturing costs that are not market-size dependent. In addition, the method and system replaces complicated and expensive machining processes with additive manufacturing (AM) processes to produce complex engine parts, such as turbine blades.

SUMMARY

A method for manufacturing small adaptive engines includes the initial step of providing a battlefield repository configured to enable additive manufacturing (AM) of engine parts and assemblies. The battlefield repository can include cloud based services such as data storage and computing power. The battlefield repository can also include inventories as well as designs, material specifications, drawings, process specifications, assembly instructions, and product verification requirements for the engine parts and assemblies. The providing the battlefield repository step can include the step of developing a model employing a rule driven decision protocol in which engine parts are fabricated using either subtractive manufacturing or additive manufacturing.

The method also includes the step of providing a compilation of recipes/signatures for building the engine parts and the assemblies using additive manufacturing (AM) processes. The compilation of recipes/signatures can include machine learning programs for performing the additive manufacturing (AM) processes. In addition, cloud based services can be utilized to facilitate machine learning during manufacture.

The method also includes the step of providing an alloy powder suitable for performing the additive manufacturing (AM) processes. The alloy powder can comprise a commercial product available from a manufacturer, or can be manufactured using a cold hearth mixing system for melting a feedstock and a gas atomization system for forming the alloy powder.

The method also include the steps of providing an additive manufacturing (AM) system configured to perform the additive manufacturing (AM) processes, and building the engine parts using the additive manufacturing (AM) system, the alloy powder, the battlefield repository, and the compilation of recipes/signatures. In an illustrative embodiment of the method, the additive manufacturing (AM) system includes a laser powder bed fusion (LPBF) system having layer-by-layer powder bed monitoring. Alternately, the additive manufacturing system can include a laser metal deposition (LIVID) system or an electron beam melting (EBM) system. The building step can also include the step of machining the additive manufactured engine parts using a variety of machining systems, such as lathes, milling tools, torches, cutting saws, power tools and measuring devices. The method also includes the steps of inspecting and certifying the engine parts, and then assembling the assemblies using the engine parts.

A system for manufacturing small adaptive engines includes a battlefield repository configured to enable additive manufacturing (AM) of engine parts and assemblies. The battlefield repository includes cloud based services such as data storage and computing power. The system also includes a compilation of recipes/signatures that include machine learning programs for building the engine parts using additive manufacturing (AM) processes. The system also includes a foundry system for providing an alloy powder for the additive manufacturing (AM) system. The foundry system can include a cold hearth mixing system for melting a feedstock and a gas atomization system for forming the alloy powder. The system also includes an additive manufacturing (AM) system configured to perform the additive manufacturing (AM) processes using the battlefield repository and the compilation of recipes/signatures.

BRIEF DESCRIPTION OF THE DRAWINGS

Exemplary embodiments are illustrated in the referenced figures of the drawings. It is intended that the embodiments and the figures disclosed herein to be considered illustrative rather than limiting.

DETAILED DESCRIPTION

"Cloud service" means the on-demand availability of computer system resources, especially data storage and computing power, without direct active management by the user. An exemplary cloud service is Amazon Web Services Inc., Seattle, Wash. 98109. "Machine learning" means an application of artificial intelligence (AI) that provides systems the ability to automatically learn and improve from experience without being explicitly programmed. In the present application, machine learning includes computer programs that can access parts data and use it to control additive manufacturing and machining systems to make parts.

Figure 1A:
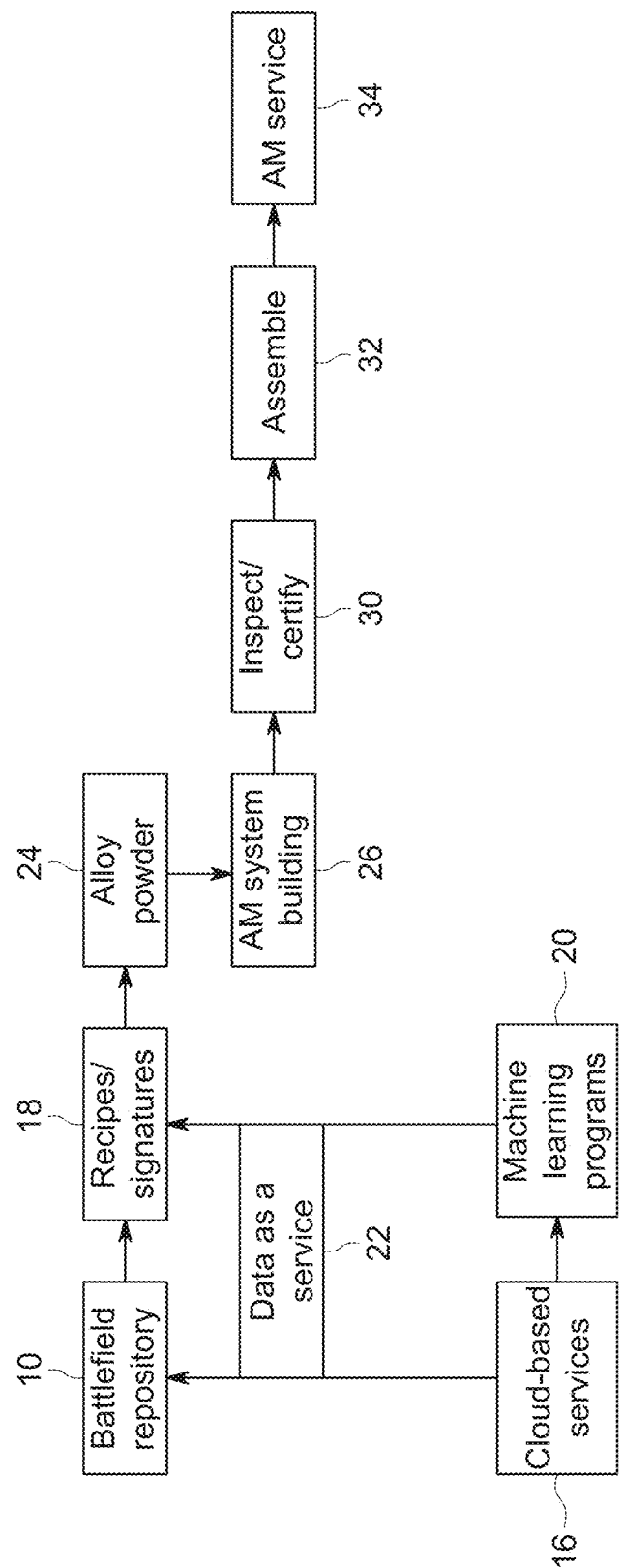
FIG. 1A is a schematic drawing of a method for manufacturing small adaptive engines.
Figure 1B:
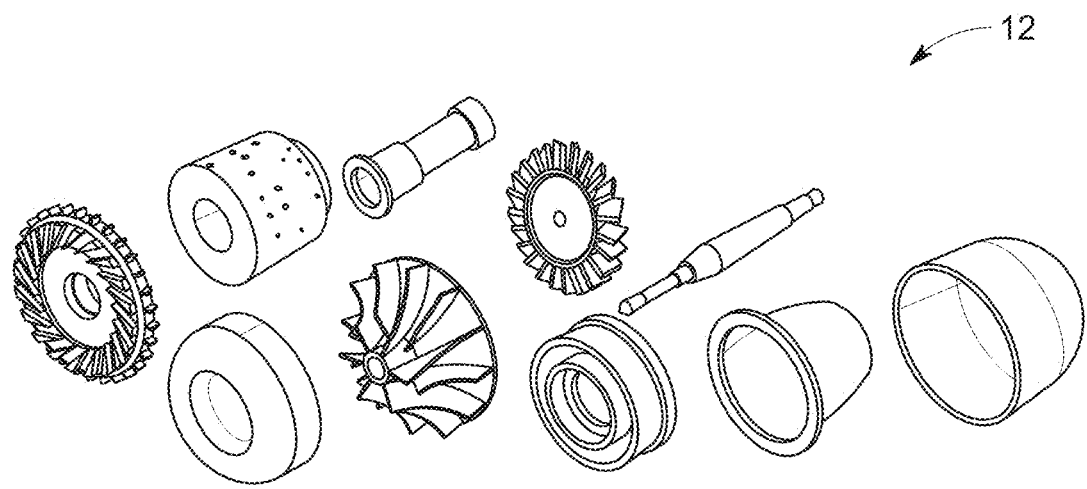
FIG. 1B is a perspective drawing of engine parts manufactured using the method for manufacturing small adaptive engines.
Figure 1C:
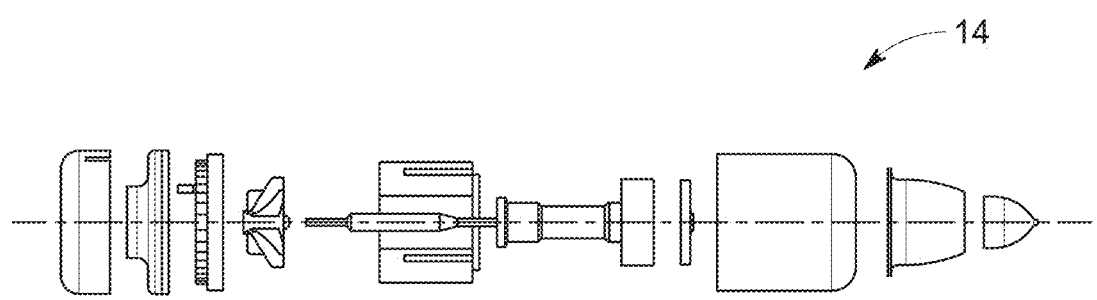
FIG. 1C is a perspective drawing of an assembly manufactured using the method for manufacturing small adaptive engines.

Referring to FIGS. 1A-1C, steps in a method for manufacturing small adaptive engines includes the initial step of providing a battlefield repository 10 (FIG. 1A) configured to enable additive manufacturing (AM) of engine parts 12 (FIG. 1B) and assemblies 14 (FIG. 1C). The battlefield repository 10 (FIG. 1A) can include cloud based services 16 (FIG. 1A) such as data storage and computing power. The battlefield repository 10 (FIG. 1A) can also include inventories as well as designs, material specifications, drawings, process specifications, assembly instructions, and product verification requirements for the engine parts and assemblies. Further details of the battlefield repository 10 (FIG. 1A) will become more apparent as the description proceeds.

As shown in FIG. 1A, the method also includes the step of providing a compilation of recipes/signatures 18 for building the engine parts and the assemblies using additive manufacturing (AM) processes. The compilation of recipes/signatures 18 can include machine learning programs 20 for performing the additive manufacturing (AM) processes. In addition, the cloud based services 16 can be utilized to facilitate machine learning during manufacture. Further, the data contained in the battlefield repository 10 and the compilation of recipes/signatures 18 can be sold commercially as data as a service 22. Further details of the compilation of recipes/signatures 18 will become more apparent as the description proceeds.

Still referring to FIG. 1A, the method also includes the step of providing an alloy powder 24 suitable for performing the additive manufacturing (AM) processes. The alloy powder can be a commercial additive manufacturing grades alloy powder. For example, MolyWorks Material Corporation, Los Gatos Calif., manufactures alloy powders for high-temperature metal alloys, such as titanium-based alloys, nickel-based alloys and moly-based alloys. Rather than providing the alloy powder 24 from a manufacturer, a foundry system can be used to make the alloy powder 24. For example, the foundry system can include a cold hearth mixing system for melting a feedstock and a gas atomization system for forming the alloy powder. The cold hearth mixing system can be configured to operate with scrap metal, and can include a composition correction system permitting the characteristics of the alloy powder to be tailored to the fabrication of a particular engine part. U.S. Pat. No. 9,925,591 B2 entitled "Mixing Cold Hearth Metallurgical System and Process For Producing Metals and Metal Alloys", which is incorporated herein by reference, describes some of the foundry equipment that can be used in the foundry system. Exemplary feedstocks include scrap, recycled metal, waste, indigenous materials, or a combination of feedstocks.

Still referring to FIG. 1A, the method also includes the steps of providing an additive manufacturing (AM) system 26 configured to perform the additive manufacturing (AM) processes, and then building the engine parts 12 using the additive manufacturing (AM) system 26, the alloy powder 24, the battlefield repository 10 and the compilation or recipes/signatures 18. By way of example, the additive manufacturing (AM) system can include a laser powder bed fusion (LPBF) system in the form of a modified EOS M100 3D-Printer manufactured by EOS GmbH Electro Optical Systems.

Still referring to FIG. 1A, the method also includes the step of inspecting/certifying the engine parts 12, step 30 and assembling the engine parts 12 into the assemblies 14, step 32. The method can also include the step of providing additive manufacturing services, step 34.

Figure 2:
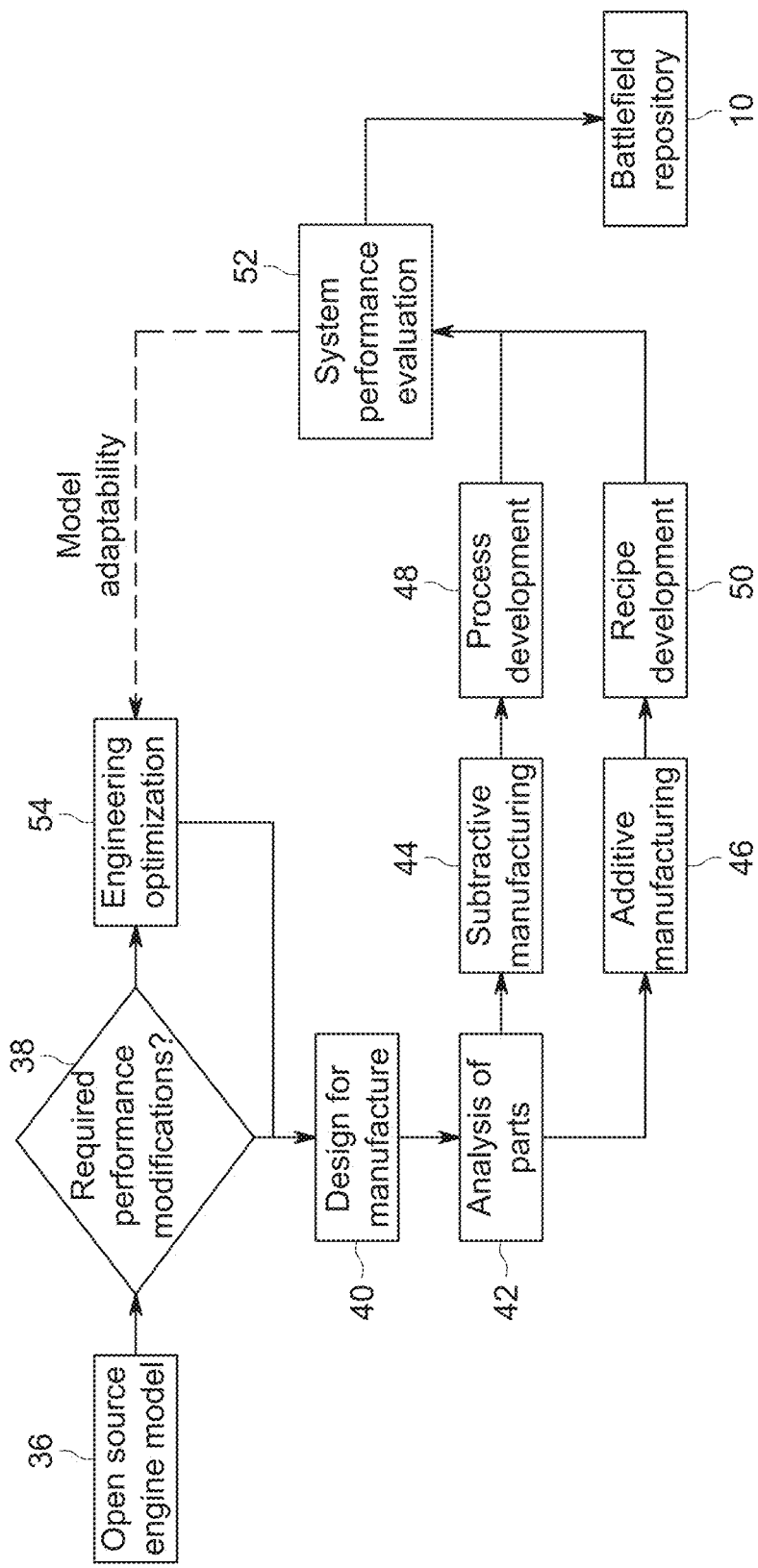
FIG. 2 is a schematic drawing showing steps in the compiling a battlefield repository.

Referring to FIG. 2, exemplary steps in the providing of the battlefield repository 10 and the compilation of the recipes/signatures 18 are shown. The first step is to develop an open source engine model, step 36. In order to repeatably meet rigorous cost and production schedules without a significant dependency on design specifics, one must enter in the design process with some general design for manufacturing rules. This is very true in AM manufacturing processes, as effectively and efficiently using AM processes requires intentional design. As a brief summary, the key areas are as follows:

1. Minimize dependency on manufacturing processes that require heavy tooling (and subsequent long lead times), such as stamping, forging, metal injection molding.

2. Use precision tolerances only where needed, in as few numbers of parts as possible.

3. Design key parts for their targeted method of manufacture, whether subtractive or additive. E.g. AM parts will need to be optimized for powder removal, self-support, reduced material (reduced print times).

4. Subject designs to the "standard" per computer aided design (CAD) data output of the targeted manufacturing process: e.g. nearly every production CNC on the market will fall within ±0.005 directly out CAD to computer aided manufacturing (CAM) processing.

5. Reduce part count.

Beginning an open-source manufacturing model with these in mind will eliminate development, modification, tooling, and lead time inertia, thereby reducing system costs. Applicant presents the following example of a sustainable small jet turbine manufacturing model. The key innovations include the providing of the battlefield repository 10 (FIG. 1A) and the compilation of recipes/signatures 18 (FIG. 1A). These enable collection of technologies and data that will facilitate consistent, low-cost, and on demand manufacturing of engine parts and assemblies.

Still referring to FIG. 2, additional steps in the providing of the battlefield repository 10 and the compilation of recipes/signatures 18 can include:

Step 38—Required performance modifications step.
Step 40—Design for manufacture step.
Step 42—Analysis of parts step.
Step 44—Subtractive manufacturing decision step.

Step 46—Additive manufacturing decision step.
Step 48—Process development step.
Step 50—Recipe development step.
Step 52—System performance evaluation.
Step 54—Engineering optimization step.

Figure 4:
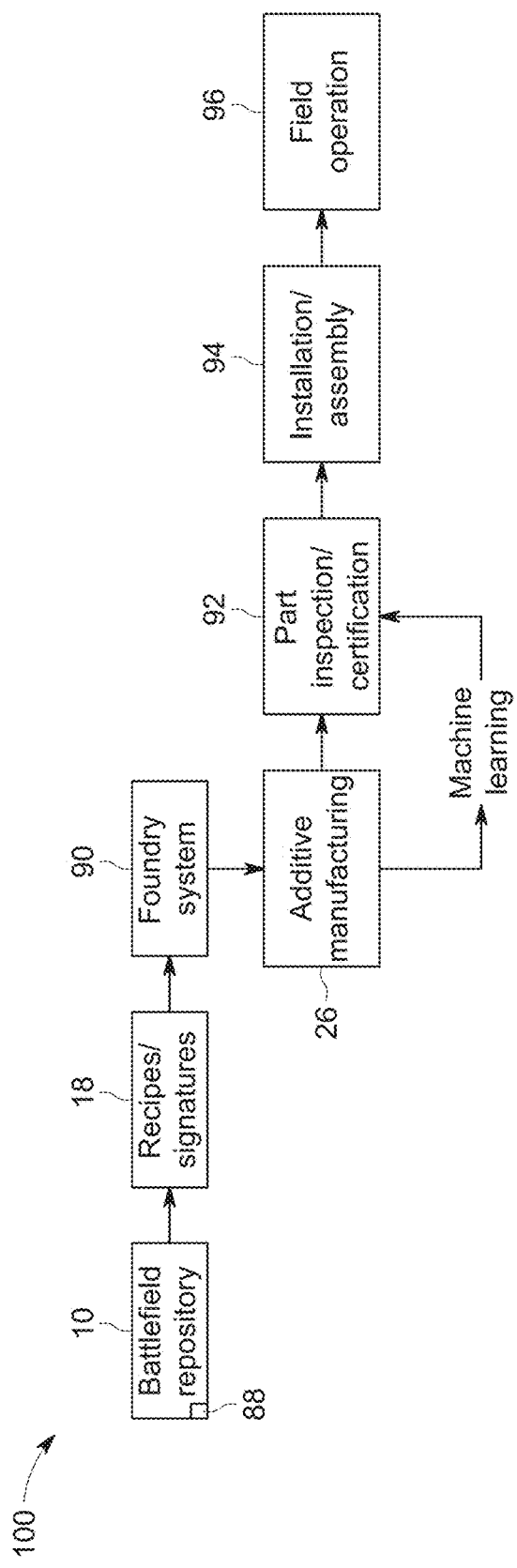
FIG. 4 is a schematic diagram of a system for manufacturing small adaptive engines.

System. Referring to FIG. 4, a system 100 for manufacturing small adaptive engines is illustrated schematically. The system 100 includes the battlefield repository 10 that includes the cloud services 88. The system 100 also includes the compilation of recipes/signatures 18 that include machine learning programs for building the engine parts using additive manufacturing (AM) processes. The system 100 also includes a foundry system 90 for providing an alloy powder for the additive manufacturing (AM) system. The foundry system 90 can include a cold hearth mixing system for melting a feedstock and a gas atomization system for forming the alloy powder 24. The system 100 also includes the additive manufacturing (AM) system 26 configured to perform the additive manufacturing (AM) processes. The system 100 can also include a part inspection certification system 92, an installation/assembly system 94 and a field operation system 96.

Figure 3A:
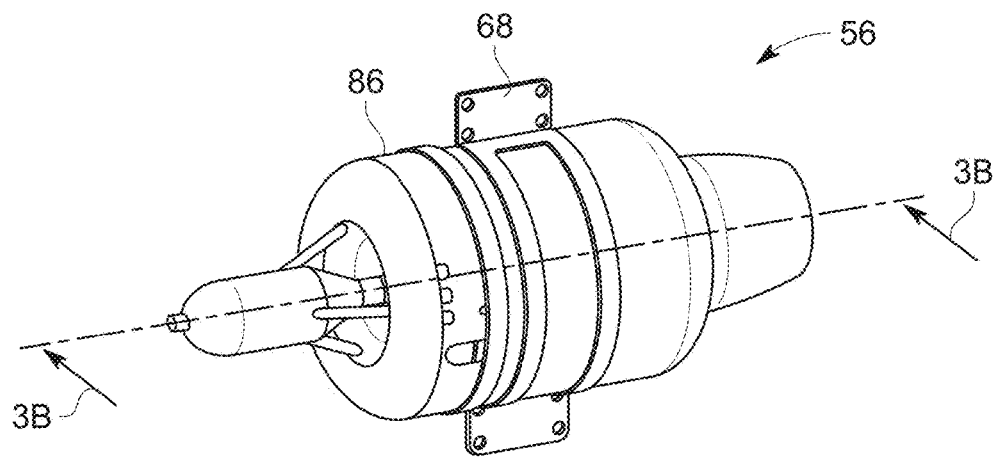
FIG. 3A is a perspective drawing of a small adaptive engine manufactured using the method.
Figure 3B:
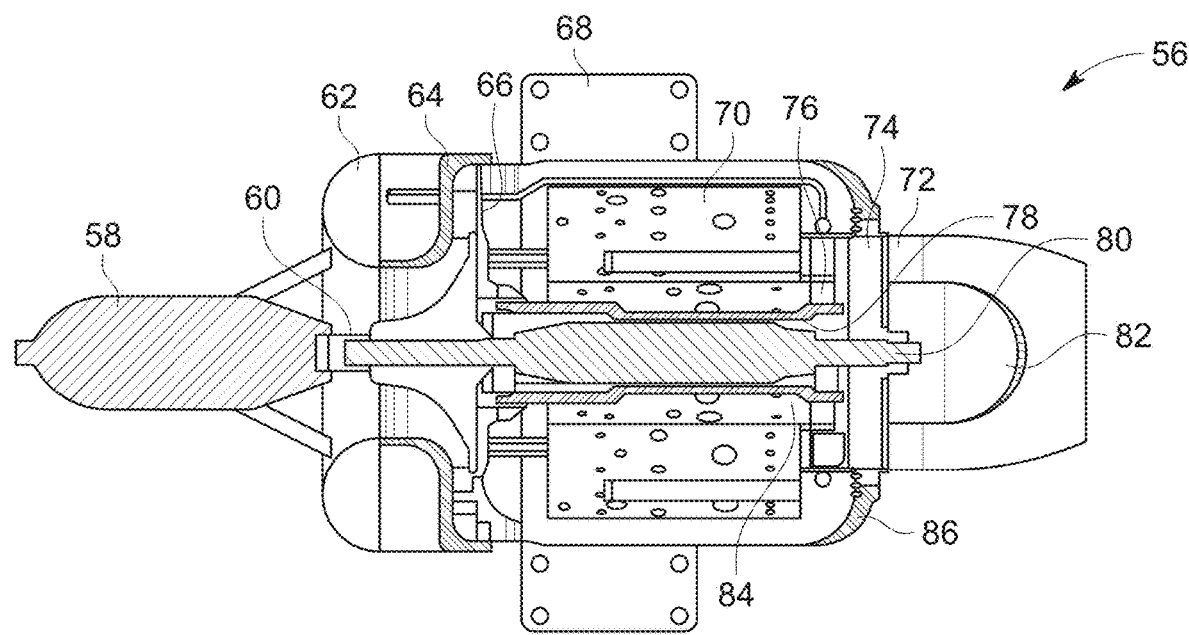
FIG. 3B is a cross sectional drawing of the small adaptive engine taken along section line 3B-3B of FIG. 3A.

Example 1. In this example, the inventors apply the method shown in FIGS. 1 and 2 to the manufacture of a small engine in the form of a jet turbine engine 56 (FIGS. 3A and 3B). The "open-source" SV-120 RC Jet Turbine design, which is essentially the Simjet S120, also very comparable to the KingTech K-120, and other 120N (27 lb) thrust variant RC turbine systems was selected as the jet turbine engine 56. As shown in FIG. 3B, the exemplary jet turbine 56 includes a turbine starter 58, a compressor 60, an intake cowling 62, a duct 64, a diffuser 66, a mounting bracket 68, a combustion chamber 70, a jet nozzle 72, a turbofan 74, a nozzle vane guide 76, a bearing 78, a shaft 80, a thrust cone 82, a shaft tunnel 84 and an outer casing 86.

Figure 5:
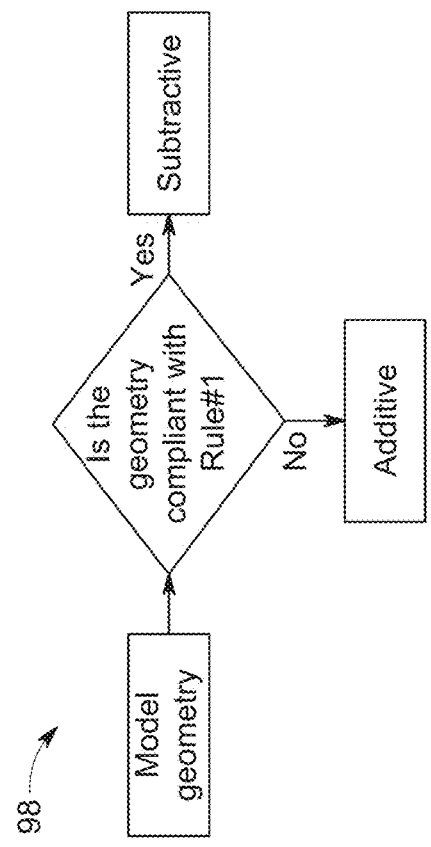
FIG. 5 is a schematic diagram of a decision process during use of the system for manufacturing small adaptive engines.

In Example 1, the inventors break down the proposed model to provide context for the "what", "how", and "why" of each model stage. The proposed outcome of the solicitation is simple: Build a sustainable and adaptable manufacturing model that can ensure very low production costs (<$100 per lb. of thrust) and short lead times despite the number of production units or design changes. Additive manufacturing is a uniquely adaptable technology, as it is a technology wherein lead time and costs are determined primarily through part volume alone. This is in contrast to CNC machining, where costs and lead times are often driven through number and complexity of features, volume, and material type. There are numerous relative design-for-manufacture (DFM) considerations for both subtractive and additive manufacturing techniques. FIG. 5 illustrates an exemplary decision making protocol 98 for the subtractive and additive manufacturing decision. The implementation of this protocol can comprise a rule driven analysis to determine manufacturing method applicability (i.e., subtractive or additive). Example rules include wall thicknesses, interior geometries and number of sides with features.

1. Model Adaptability: A model that is adaptable is one that facilitates feedback loops that can effect change. Once an open-source design is presented, the very first decision stage that is met is whether changes are required to adapt the turbine design to a specific use-case. This could be in scaling for increased thrust, optimization for efficiency, or simply facilitating prototype iterations to ensure that all performance metrics are met. Of all the stages in the process, this is the least "open-source", as it would typically initiate a performance requirement analysis reference to a defined use case. Militarily, specific use-case information is generally controlled or classified.

2. Design for Manufacture and Analysis of Parts: After it is determined that the design will satisfactorily meet requirements, each discrete part of the turbine assembly can be analyzed for manufacturing methods (that may differ from the original intent of the designer). It is important to remember that high volume production choices can widely vary from low volume decisions. This is particularly true in areas of low volume cost reduction (based on things like NRE and tooling costs). Furthermore, additive manufacturing (AM) can facilitate part optimization that is otherwise untenable with other manufacturing options. For example, small turbine designs generally use copper tubing to route fuel from a single inlet to various combustion chamber ignition points. These fuel routing features could be non-linearly ported directly through the combustion chamber itself reducing part count and manufacturing costs.

3. Subtractive Manufacture and Process Development: While many parts of a small engine, such as a jet turbine, are ideal for AM, the method recognizes that not every part can be done as cost effectively with AM processing. Thus, the model will seek to bin each part for an optimal manufacturing process. Most standard manufacturing processes will be accounted for within subtractive manufacture, including: laser cutting, electron displacement machining (EDM), CNC turning, and CNC machining. Once engine parts have been evaluated, binned, and optimized for the process of choice, a descriptive process can be defined. It is necessary to drive all details to the CAD stage, seeking to ensure that no tolerances are beyond the standard capabilities of the targeted process. By requiring that tolerances and other manufacturing details are "model dependent" (meaning native to the 3D development model), one can ensure that the engine part can be manufactured in a completely automated way. This can significantly reduce lead time, quoting, and ultimately part cost. This process has been explored and effectively implemented in industry by companies such as PROTOLABS, demonstrating to the community that single operators can run multiple machines in prototype production with limited oversight.

4. Additive Manufacture and Recipe Development: Metal AM, in its current form, can sometimes struggle to be competitive with an off-the-shelf stock of cast or machined parts. However, AM capability can truly disrupt the market—particularly when paired with machine learning. It can eliminate most NRE costs, budget forecasting, and volume storage, facilitating the leanest of all on-demand manufacturing techniques with a known cost volume. Small jet turbines have several parts that are ideally suited for AM manufacture, namely the compressor 60 (FIG. 3B), the nozzle vane guide 76 (FIG. 3B), the diffuser 66 (FIG. 3B), and the turbofan 74 (FIG. 3B). Metal AM processes are inherently driven by CAD data, and designers can avoid secondary machining with intentional design choices. Furthermore, because "stock" in metal AM is always a fixed powder (compared to billets), the process is better suited for automation than subtractive machining. The metal AM 'recipe' is admittedly complex as it requires control of factors such as particulate size, oxygen content, sintering laser performance, and layer thickness (for consistent sintering). Each varies with the selected alloy. Once identified, however, it is repeatable, and employ machine learning is employed to ensure layer-by-layer reliability in the build process. Much like vetting a manufacturing partner, Applicant can also equip other additive manufacturing vendors with the technology necessary to meet the manufacturing requirements. In this way, a more successful build and a wide manufacturing network to support and diversify with consistent and repeatable build quality can be provided.

5. System Performance Evaluation: Once the parts have been fabricated and assembled, they must be tested to validate the system performance compared to expected results. Furthermore, to drive costs out of the system, a statistical study can be performed on upstream per-part 'markers' that ensure a successful jet turbine assembly. One key point here is to drive out the need to fixture and test the complete turbine assembly, as that simply adds cost to the model. Thus, we will leverage the same tools we will be developing for successful manufacturing at the piece part level to ensure high quality, functionally reliable assemblies.

6. Battlefield Repository: Once the design, processes, recipes, and statistical testing requirements are validated, the complete data package into the battlefield repository 10 (FIG. 1A). This data can then be made available via secure Amazon AWS cloud access and dropped directly into the various components of the additive manufacturing system system. There are also a significant number of machine-learning based tools that can be used to further advance the adaptability and sustainability of the overall manufacturing and procurement model, notably, Forecast. Amazon Forecast is a fully managed service that uses machine learning to deliver highly accurate forecasts. Based on the same technology used at Amazon.com, Amazon Forecast uses machine learning to combine time series data with additional variables to build forecasts. Once a foundation of historical data is provided, it can begin to produce a forecasting model capable of making predictions that are up to 50% more accurate than looking at time series data alone.

Figure 6A:
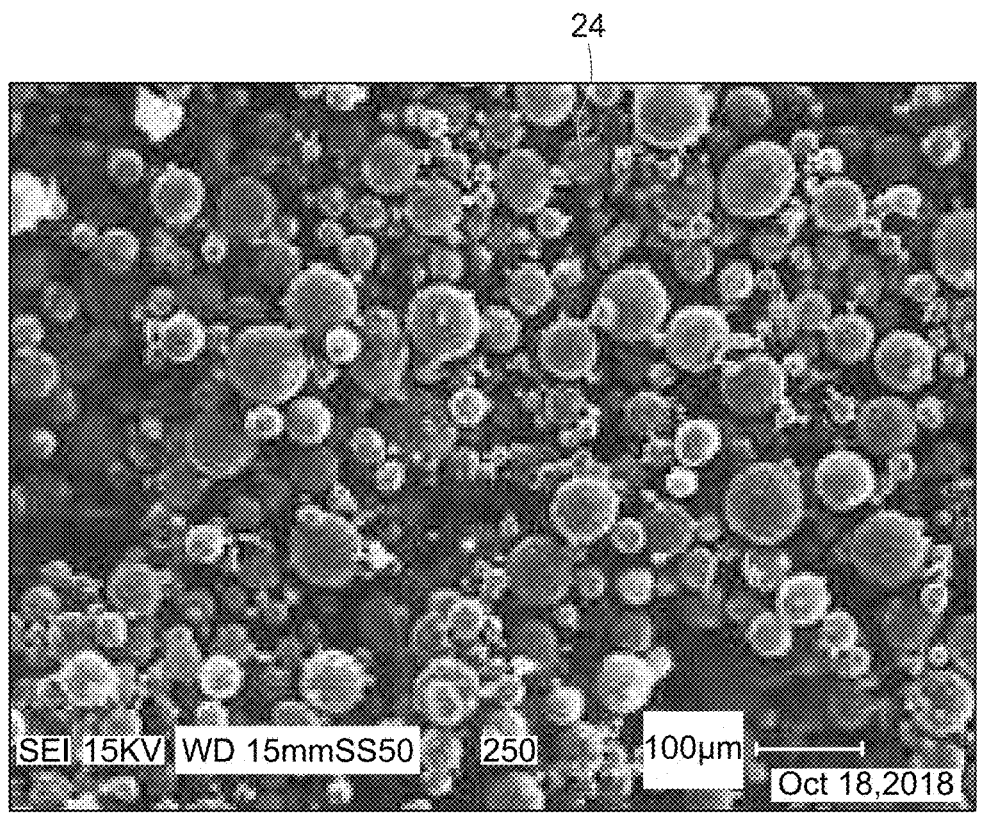
FIGS. 6A and 6B are photomicrographs of an alloy powder suitable for use in the method and system for manufacturing small adaptive engines.
Figure 6B:
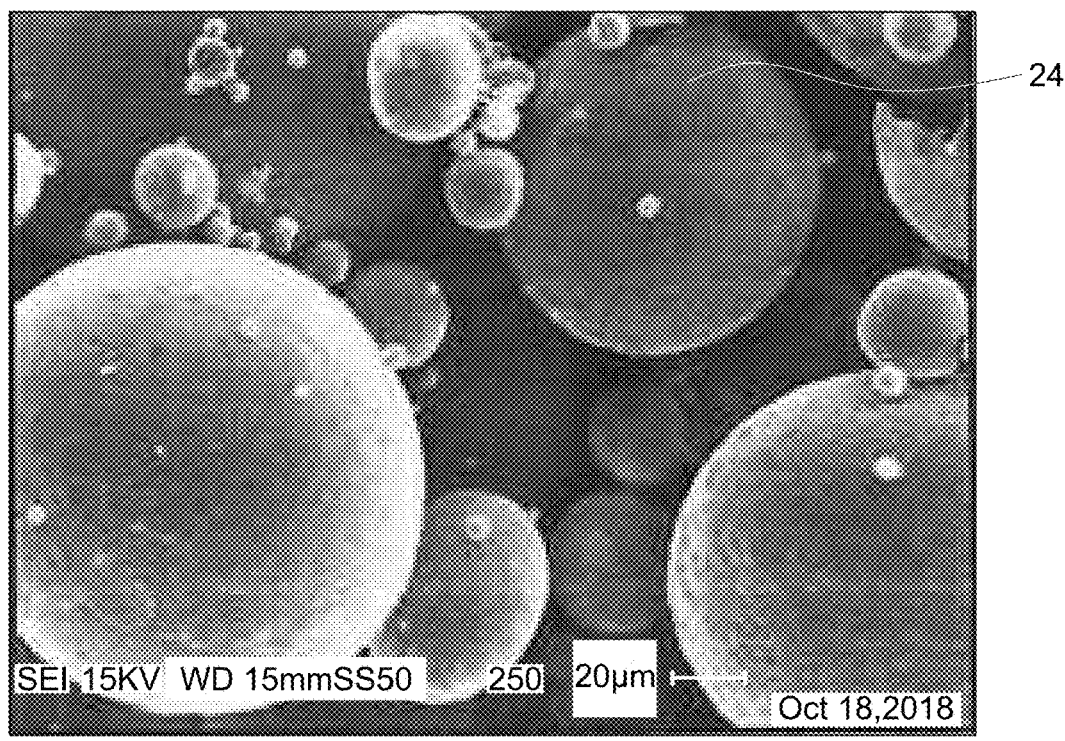

Example 2. In this example, a jet turbine assembly is assembled using the system 100 of FIG. 4. At a user command, the engine part 12 (FIG. 1B) would be called from the battlefield repository 10 (FIG. 1A), and all requisite information would be pulled. The part-by-part recipes from the recipes/signatures 18 (FIG. 1A) would be passed to a user, or automated system to source the correct alloy powder 24. FIGS. 6A and 6B illustrate characteristics of alloy powder 24 manufactured by MolyWorks Materials Corporation, Los Gatos Calif. Each engine part 12 would be built and inspected visually from the weld pool up on a layer-by-layer assessment that would consummate the part inspection. Once the "kit" of turbine parts is completed, a user would assemble the turbine for final use.

Figure 7A:
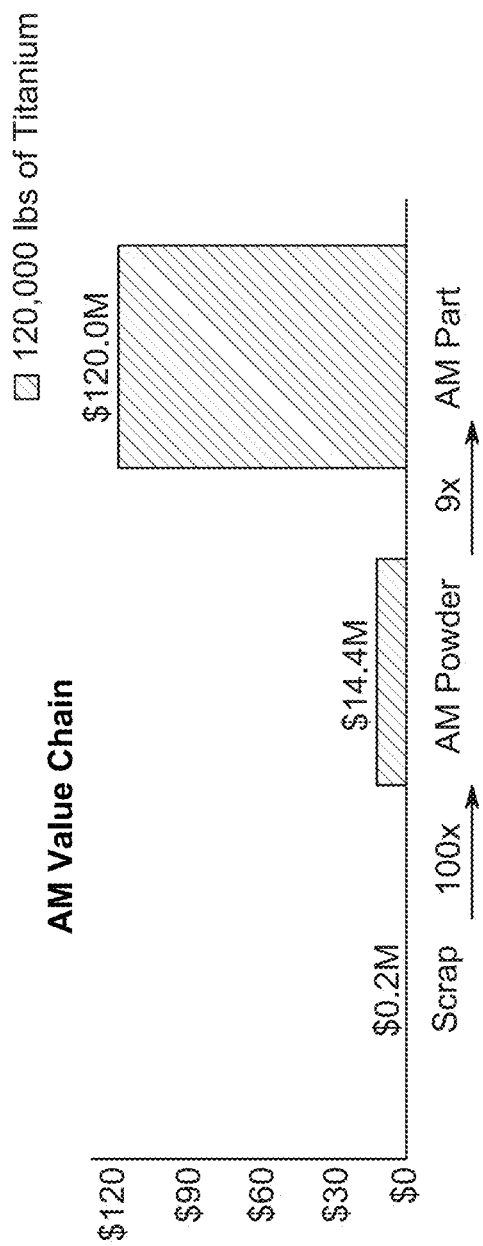
FIG. 7A is a schematic drawing illustrating an additive manufacturing value chain in the system for manufacturing small adaptive engines.
Figure 7B:
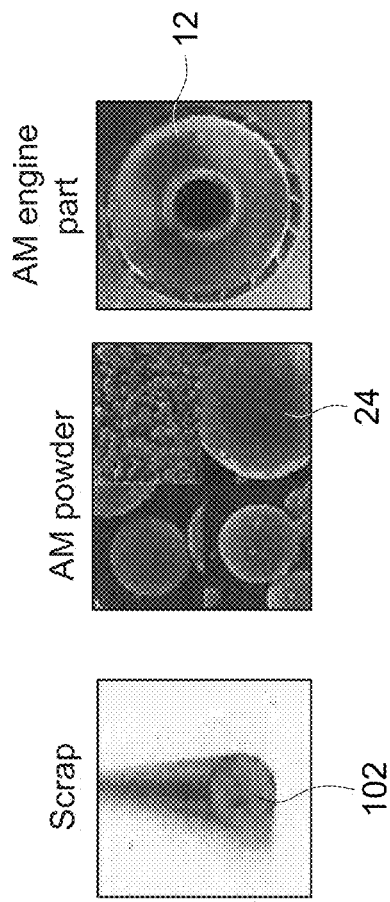
FIG. 7B is a pictorial drawing illustrating scrap, AM powder and an AM part of the value chain in the system for manufacturing small adaptive engines.

Example 3. In this example, which is illustrated in FIGS. 7A and 7B, a scrap metal 102 has been used to make the alloy powder 24 using a cold hearth melting process followed by an atomization process substantially as previously described, and performed by MolyWorks Materials Corporation, Los Gatos Calif. MolyWorks Materials Corporation has designed, constructed, and demonstrated a mobile pilot-scale production system which is currently being developed for battlefield recycling of scrap metals at the point of need. The production process is used for steel, stainless steel, aluminum, copper, and titanium. Titanium production requires tight control over inorganic impurities, especially oxygen, nitrogen, and hydrogen, which are measured on-site. Out of various chunks of scraps and offcut metals of nearly any alloy distribution (pending oxidation susceptibility and wetting properties), engine parts 12 can be made. FIG. 7A illustrates the costs benefits of the method of producing AM powder then making AM parts.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A method for manufacturing small adaptive engines comprising:
   providing a battlefield repository having cloud based services configured to enable additive manufacturing (AM) of engine parts and assemblies, the battlefield repository including inventories, designs, material specifications, drawings, process specifications, assembly instructions, and product verification requirements for the engine parts and assemblies, the battlefield repository developed using an open source engine model configured to identify the engine parts suitable for manufacture using additive manufacturing (AM) or subtractive manufacturing;
   providing a compilation of recipes/signatures for building the engine parts and the assemblies using additive manufacturing (AM) processes, the compilation of recipes/signatures including machine learning programs for performing the additive manufacturing (AM) processes, the compilation of recipes/signatures including manufacturing rules for performing the additive manufacturing (AM) processes to manufacture the engine parts suitable for manufacture using additive manufacturing (AM);
   providing an alloy powder having characteristics selected for performing the additive manufacturing (AM) processes;
   providing an additive manufacturing (AM) system configured to perform the additive manufacturing (AM) processes using the alloy powder; and
   building the engine parts using the additive manufacturing (AM) system, the alloy powder, the battlefield repository, and the compilation of recipes/signatures.

2. The method of claim 1 further comprising inspecting and certifying the engine parts, and then assembling the assemblies using the engine parts.

3. The method of claim 1 wherein the providing the alloy powder step comprises manufacturing the alloy powder using a cold hearth mixing system for melting a feedstock and a gas atomization system for forming the alloy powder.

4. The method of claim 1 wherein the providing the battlefield repository step includes a design for manufacture step, an analysis of parts step, a subtractive manufacturing decision step, an additive manufacturing decision step, and a process development step.

5. The method of claim 1 wherein the engine parts include a turbine and the compilation of recipes/signatures is configured to adapt the turbine to a specific use.

6. The method of claim 1 wherein the alloy powder comprise a titanium based alloy or a nickel based alloy.

7. The method of claim 1 further comprising providing data services based on the battlefield repository and the compilation of recipes/signatures.

8. The method of claim 1 further comprising providing additive manufacturing services based on the battlefield repository and the compilation of recipes/signatures.

9. A method for manufacturing a small adaptive engine comprising:
   providing a battlefield repository having cloud based services configured to enable additive manufacturing (AM) of engine parts and assemblies, the battlefield repository including inventories, designs, material specifications, drawings, process specifications, assembly instructions, and product verification requirements for the engine parts and assemblies, the battlefield repository developed using an open source engine model configured to identify the engine parts suitable for manufacture using additive manufacturing (AM) or subtractive manufacturing;

providing a compilation of recipes/signatures for building the engine parts and the assemblies using additive manufacturing (AM) processes, the compilation of recipes/signatures including machine learning programs for performing the additive manufacturing (AM) processes, the compilation of recipes/signatures including manufacturing rules for performing the additive manufacturing (AM) processes to manufacture the engine parts suitable for manufacture using additive manufacturing (AM);

manufacturing an alloy powder having characteristics suitable for performing the additive manufacturing (AM) processes including particulate size, oxygen content, and sintering laser performance;

providing an additive manufacturing (AM) system configured to perform the additive manufacturing (AM) processes using the alloy powder; and building the engine parts using the additive manufacturing (AM) system, the alloy powder, the battlefield repository, and the compilation of recipes/signatures.

10. The method of claim 9 further comprising inspecting and certifying the engine parts, and then assembling the assemblies using the engine parts.

11. The method of claim 9 wherein the manufacturing the alloy powder step comprises manufacturing the alloy powder using a cold hearth mixing system for melting a feedstock and a gas atomization system for forming the alloy powder.

12. The method of claim 9 further comprising providing data services based on the battlefield repository and the compilation of recipes/signatures.

13. The method of claim 9 further comprising providing additive manufacturing services based on the battlefield repository and the compilation of recipes/signatures.

14. The method of claim 9 wherein the open source engine model includes a design for manufacture step, an analysis of engine parts step, a subtractive manufacturing decision step, an additive manufacturing decision step, and a process development step.

15. The method of claim 9 wherein the engine parts include a turbine and the compilation of recipes/signatures is configured to adapt the turbine to a specific use.

* * * * *